US006754367B1

(12) United States Patent
Ito et al.

(10) Patent No.: US 6,754,367 B1
(45) Date of Patent: Jun. 22, 2004

(54) METHOD AND APPARATUS FOR AUTOMATICALLY DETECTING INTRUSION OBJECT INTO VIEW OF IMAGE PICKUP DEVICE

(75) Inventors: Wataru Ito, Kodaira (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 804 days.

(21) Appl. No.: 09/671,178

(22) Filed: Sep. 28, 2000

(30) Foreign Application Priority Data

Sep. 30, 1999 (JP) ............................................. 11-277850

(51) Int. Cl.[7] ................................................. G06K 9/34
(52) U.S. Cl. ........................ 382/103; 382/190; 382/170; 382/282; 382/171; 348/154; 348/155
(58) Field of Search ................................. 382/103, 104, 382/171, 190, 209, 219, 278, 282, 170; 348/152–155, 352, 699, 700

(56) References Cited

U.S. PATENT DOCUMENTS

| 4,783,833 | A | * | 11/1988 | Kawabata et al. ........... 382/107 |
| 5,103,305 | A | * | 4/1992 | Watanabe .................... 382/236 |
| 5,150,426 | A | * | 9/1992 | Banh et al. .................. 382/103 |
| 5,193,001 | A | * | 3/1993 | Kerdranvrat ................. 348/701 |
| 5,838,365 | A | * | 11/1998 | Sawasaki et al. ........... 348/169 |
| 6,005,493 | A | * | 12/1999 | Taniguchi et al. ........... 340/990 |
| 6,067,367 | A | * | 5/2000 | Nakajima et al. ........... 382/103 |
| 6,636,635 | B2 | * | 10/2003 | Matsugu ...................... 382/218 |

* cited by examiner

*Primary Examiner*—Timothy M. Johnson
*Assistant Examiner*—Yosef Kassa
(74) *Attorney, Agent, or Firm*—Antonelli, Terry, Stout & Kraus, LLP

(57) ABSTRACT

An intruding object detecting method and an intruding object detecting apparatus for judging whether an detected object is an intruding object or not even in the condition that there are shadows of moving objects other than target objects to be detected, such as shaking trees, leaves thereof, etc. An image signal is supplied from an image pickup device; a moving object is extracted from the image signal by a subtraction method; division is made between the image signal and a reference background image signal for every pixel so as to produce a ratio image; a histogram of luminance values (pixel values) is calculated on a part of the ratio image corresponding to the moving object extracted in the extracting step; a pixel value on the part of the ratio image corresponding to the extracted moving object is calculated in ratio representation from the calculated histogram; the calculated pixel value in ratio representation is estimated; and the extracted moving object is judged to be an intruding object or not, on the basis of the estimation of the pixel value in ratio representation. Thus, intruding objects are detected in the field of view to be monitored.

30 Claims, 12 Drawing Sheets

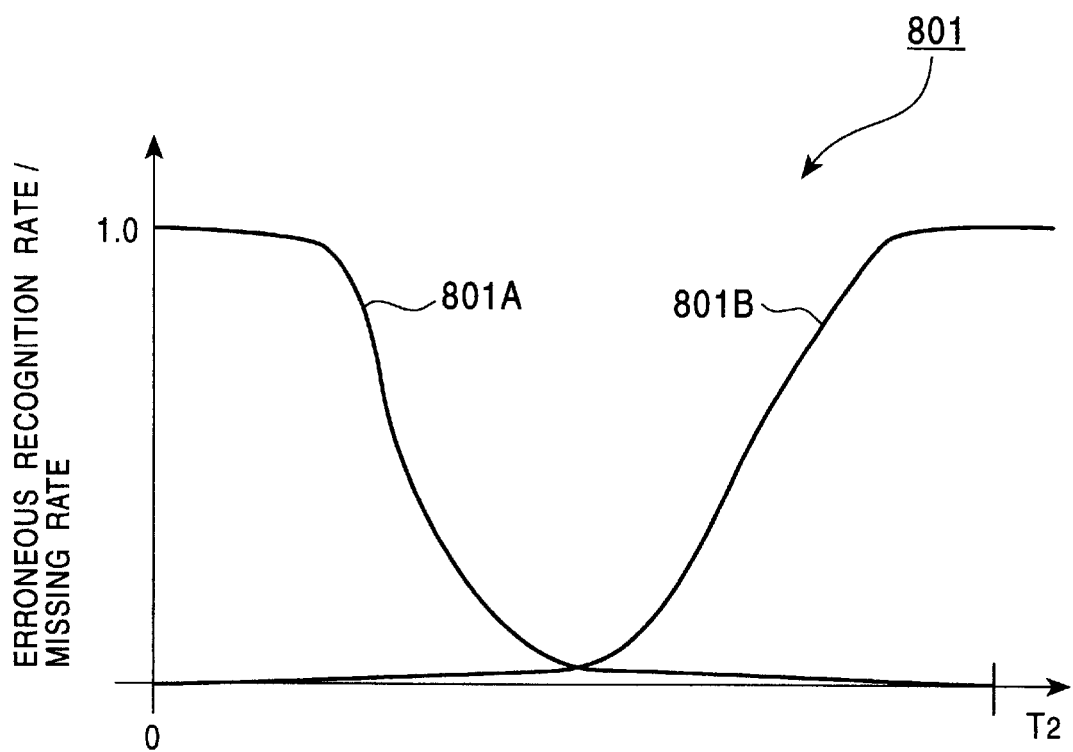

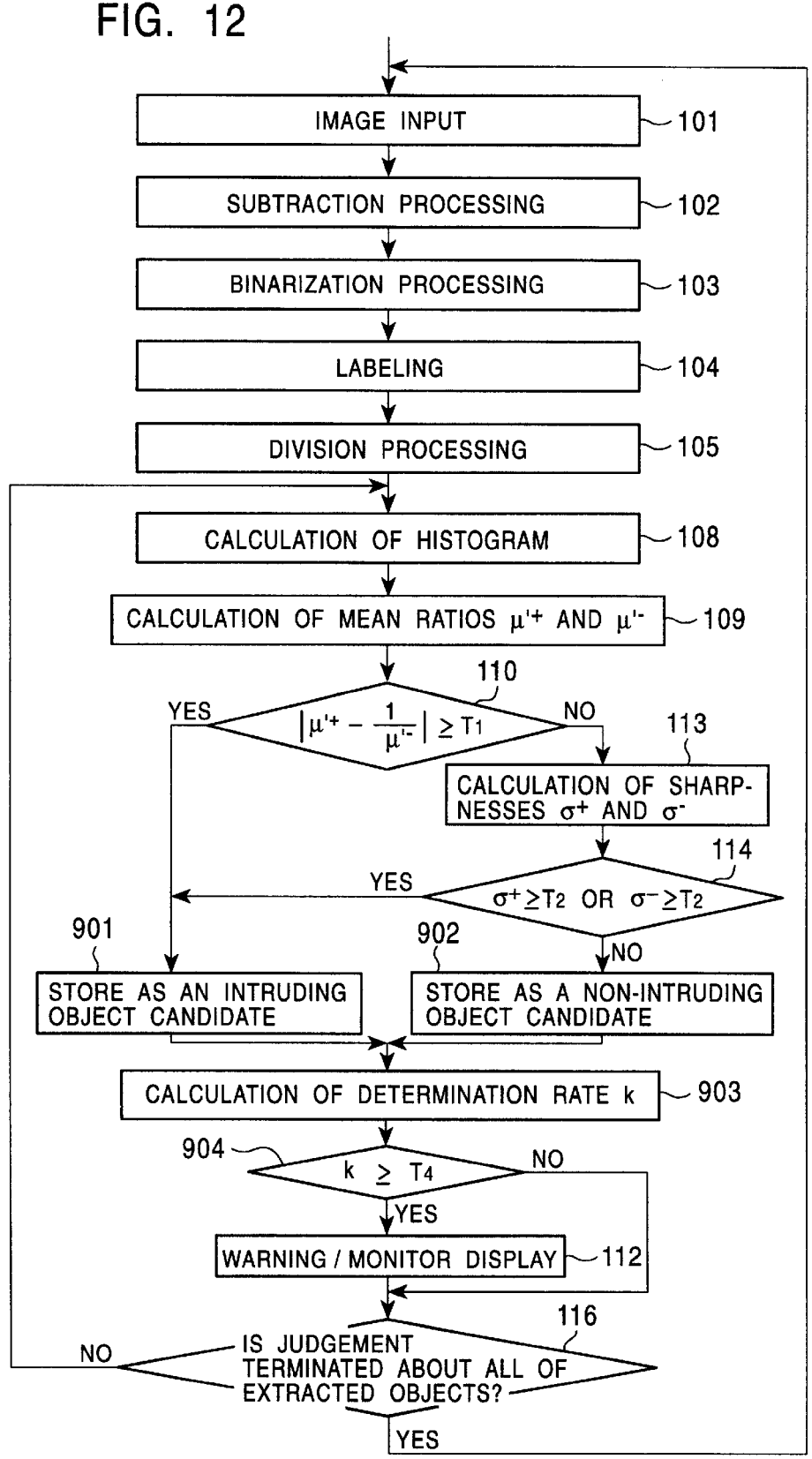

METHOD AND APPARATUS FOR AUTOMATICALLY DETECTING INTRUSION OBJECT INTO VIEW OF IMAGE PICKUP DEVICE

BACKGROUND OF THE INVENTION

The present invention relates to a monitoring apparatus using an image pickup apparatus, and particularly relates to an intruding object detecting method and an intruding object detecting apparatus in which an object intruding into the field of view for image pickup is automatically detected from a video signal supplied from an image pickup device under the monitoring environment where shadows of trees, flags, or the like, are observed trembling.

An intruding object detecting apparatus using an image pickup apparatus such as a camera or the like as image input means is designed not to provide conventional manned monitoring which depends on a human monitor, but to detect an object intruding into the field of view to be monitored or to recognize the kind of the object so as to obtain predetermined information or warning measures automatically. To realize such a system, there is a method in which an input image obtained by image input means such as a camera or the like is first compared with a reference background image (that is, an image in which no object to be detected is picked up), and a difference in luminance value between the input image and the reference background image is obtained for every pixel. Thus, an area where the difference is large is extracted as an object. Such a method, called a subtraction method, has been hitherto used widely.

There is another object detecting method in the application of such a subtraction method, for example, as disclosed in JP-A-7-79429. In this method, however, there is a problem that not only intruding objects to be detected but also moving objects such as trees or flags trembling in the wind, shadows of those, or the like, may be extracted due to detection of the difference in luminance value between an input image and a reference background image for every pixel. In order to solve such a problem, JP-A-10-283466 discloses a method in which areas where moving objects other than intruding objects to be detected exist are specified, and the specified areas are subjected to a masking processing (masked as insensible areas) so that only the intruding objects are extracted.

SUMMARY OF THE INVENTION

In the aforementioned background art, however, there is a disadvantage that it is necessary to establish masked areas (insensible areas) where there are moving objects other than intruding objects to be detected so that such moving objects can be prevented from being detected erroneously. Particularly, when such moving objects other than intruding objects to be detected are shadows of trees, flags, or the like, trembling in the wind, these moving objects change their positions from moment to moment. Therefore, in order to prevent such shadows from being detected erroneously, the positions where the shadows exist must be inferred from conditions such as the season, the time zone, the position of the monitoring area (latitude, longitude, etc.), the weather, and so on. Thus, there is another disadvantage that the areas to be masked must be changed from moment to moment. Further, it is impossible to detect intruding objects which exist in the masked areas. Alternatively, in order to restrict erroneous detection (erroneous extraction) of moving objects other than intruding objects in the masked areas, a threshold value Th is required to be set high for binarization in the masked areas. However, if the threshold value is set to be high, there is a further disadvantage that intruding objects are apt to be missed. It is therefore desired that the masked areas are confined to small areas.

It is therefore an object of the present invention to eliminate the foregoing disadvantages, and to provide a reliable intruding object detecting method and a reliable intruding object detecting apparatus by which, even in the condition that there are shadows of moving objects other than target objects to be detected, judgement can be made as to whether any extracted object is an object to be detected or not, without masking the areas where the shadows exist.

In order to attain the foregoing object, an intruding object detecting method according to an aspect of the present invention comprises the steps of: supplying an image signal from an image pickup device; extracting a moving object from the supplied image signal and a reference background image signal stored in a memory device by the subtraction method; making division between the supplied image signal and the reference background image signal for every pixel so as to produce a ratio image; calculating a histogram of luminance values (pixel values) on the ratio image in the same coordinate positions as the area of each extracted object, that is, producing a histogram of a brightness change ratio; judging whether two peaks appearing in the histogram is symmetrical or not; and judging whether the extracted moving object is an intruding object or a shadow on the basis of the result of the judgement according to the first-mentioned judging step.

Preferably, in the aforementioned step of judging the symmetry of the peaks appearing in the histogram, two mean pixel values in ratio representation ($\mu'^{+}, \mu'^{-}$) are calculated on a part of the ratio image corresponding to the extracted moving object from the histogram, and an absolute value of a difference between one ($\mu'^{+}$) of the mean pixel values in ratio representation and the reciprocal ($1/\mu'^{-}$) of the other mean pixel value ($\mu'^{-}$) in ratio representation is compared with a predetermined threshold value; wherein the aforementioned judging step judges the extracted object to be an intruding object when the comparison result in the comparing step concludes that the absolute value of a difference between one of the mean pixel values in ratio representation and the reciprocal of the other mean pixel value in ratio representation is equal to or larger than the predetermined threshold value (T1), and the judging step judges the extracted object to be not an intruding object, for example, a shadow or the like, when the above-mentioned absolute value is smaller than the predetermined threshold value (T1). This judgement depends on the fact that, if there is a shadow of a tree, a flag, or the like, trembling in the wind, there appear a pair of an area which has turned bright because a shadow has disappeared due to the wind and an area which has turned dark because the shadow has appeared due to the wind, and the mean pixel value ($\mu'^{+}$) in ratio representation in pixels which have turned bright on the ratio image shows a value close to the reciprocal of the mean pixel value ($\mu'^{-}$) in ratio representation in pixels which have turned dark on the ratio image. Thus, the shadows are specified.

According to another aspect of the present invention, the step of judging the symmetry of the peaks appearing in the histogram calculates sharpnesses ($\sigma^{+}, \sigma^{-}$) of pixel value distribution on the part of the ratio image corresponding to the extracted moving object from the histogram; and compares each of the calculated sharpnesses of pixel value distribution with a predetermined threshold value. On the basis of this comparison result, the judging step judges whether the extracted object is an intruding object or not. Any pixel has a substantially fixed pixel value change ratio on the part of the ratio image corresponding to the area which has turned bright because a shadow has disappeared due to the wind. Likewise, any pixel has a substantially fixed pixel value change ratio on the part of the ratio image corresponding to the area which has turned dark because the shadow has appeared. By use of such a phenomenon, the extracted moving object is judged to be not an intruding object but a shadow.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 11 is a chart which is useful in explaining the features of determination/recognition rate in an intruding object detecting method according to a fifth embodiment of the present invention;

FIG. 12 is a flow chart of an intruding object detecting method according to a sixth embodiment of the present invention.

DESCRIPTION OF THE EMBODIMENTS

Prior to description of embodiments, the processing of the subtraction method will be first described with reference to FIG. 6.

Figure 6:
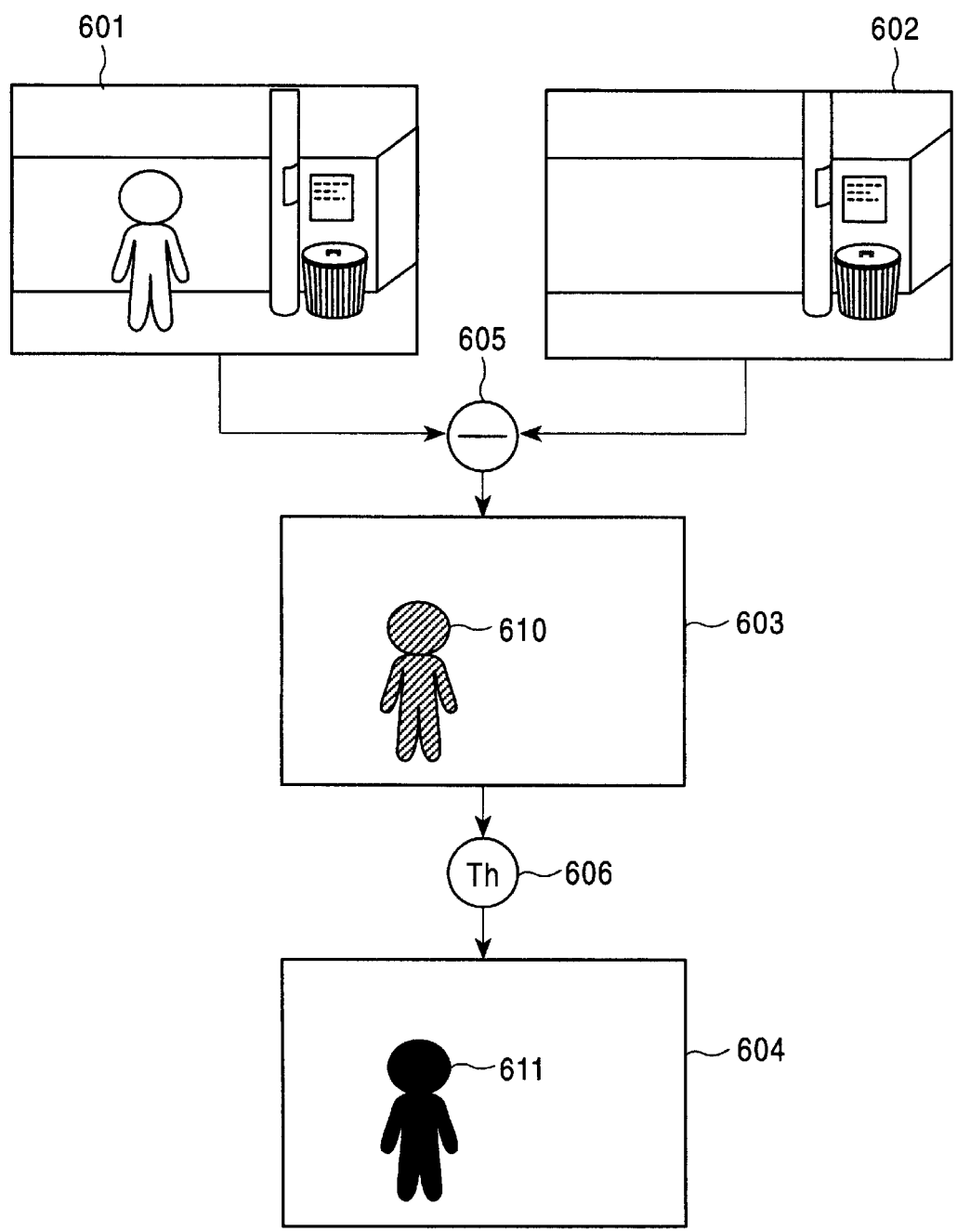
FIG. 6 is a view which is useful in explaining the subtraction method.

FIG. 6 is a view for explaining the principle of detecting (extracting) an object by the subtraction method. Reference numeral 601 represents an input image; 602, a reference background image; 603, a difference image; 604, a binarized image; 605, a subtractor; and 606, a binarizer.

In FIG. 6, the subtractor 605 calculates a difference in luminance value between the input image 601 and the prepared reference background image 602 for every pixel so as to output the difference image 603. Next, the binarizer 606 obtains the binarized image 604 in which the luminance value of every pixel is set to be "0" if the luminance value of a corresponding pixel on the difference image 603 is smaller than a predetermined threshold value Th, and to be "1" if the luminance value of a corresponding pixel on the difference image 603 is not smaller than the threshold value Th (under the calculation of luminance value of every pixel by 8 bits). Thus, a human figure object 609 taken on the input image 601 is calculated by the subtractor 605 as an area 610 where a difference is generated, and extracted as an image 611 by the binarizer 606.

Preferred embodiments of the present invention will be described below with reference to the drawings.

First, an intruding object detecting apparatus to which the present invention is applied will be described with reference to FIG. 1.

Figure 1:
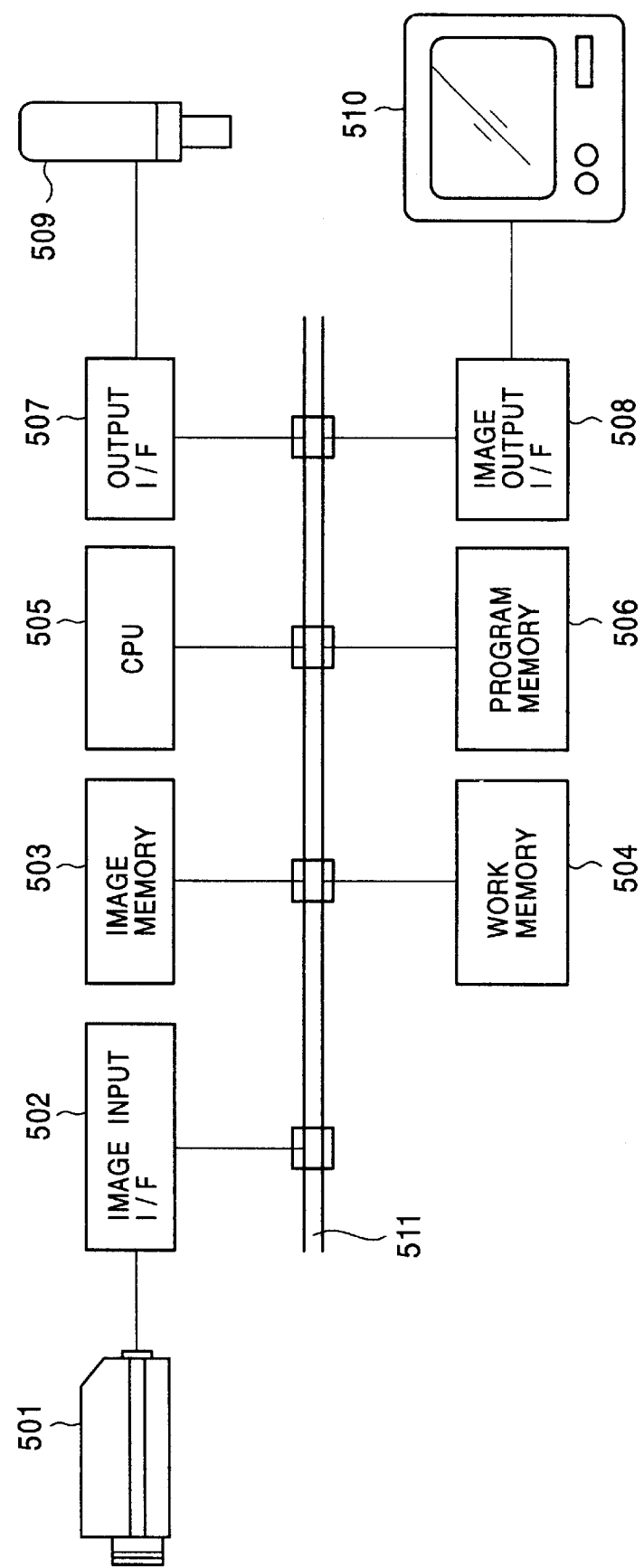
FIG. 1 is a block diagram showing the configuration of an intruding object detecting apparatus to which the present invention is applied.

FIG. 1 is a block diagram showing the hardware configuration of an intruding object detecting apparatus. Reference numeral 501 represents a television camera (hereinafter referred to as "TV camera"); 502, an image input I/F; 511, a data bus; 503, an image memory; 504, a work memory; 505, a CPU; 506, a program memory; 507, an output I/F; 508, an image output I/F; 509, a warning light; and 510, a monitor. The TV camera 501 is connected to the image input I/F 502. The warning light 509 is connected to the output I/F 507. The monitor 510 is connected to the image output I/F 508. In addition, the image input I/F 502, the image memory 503, the work memory 504, the CPU 505, the program memory 506, the output I/F 507 and the image output I/F 508 are connected to the data bus 511.

In FIG. 1, the TV camera 501 picks up an image in a pickup view field including an area to be monitored. In addition, the TV camera 501 converts the picked-up image into video signals and supplies the video signals to the image input I/F 502. The input I/F 502 converts the supplied video signals into image data in a format (for example, 320 pix wide and 240 pix high, 8 bits per pix) which can be dealt with by the intruding object detecting apparatus. The input I/F 502 supplies the converted image data to the image memory 503 through the data bus 511. The image memory 503 stores the supplied image data. The CPU 505 analyzes the image accumulated in the image memory 503, in the work memory 504 in accordance with a program stored beforehand in the program memory 506. As a result of the above analysis, such information that an object has intruded into the pickup view field of the TV camera 501 is obtained. Through the data bus 511, in accordance with the processing result, the CPU 505 turns on the warning light 509 via the output I/F 507, and displays, for example, a processing result image on the monitor 510 via the image output I/F 508. The image output I/F 508 converts a signal from the CPU 505 into a format (for example, an NTSC signal) which can be used by the monitor 510. The image output I/F 508 supplies the converted signal to the monitor 510. The monitor 510 displays, for example, an intruding object detecting result image. Although the following flow chart will be described entirely with reference to FIG. 1 which is an example of the hardware configuration of the aforementioned object tracking/monitoring apparatus, it can be carried out by any other object tracking/monitoring apparatus having a difference hardware configuration.

Figure 2:
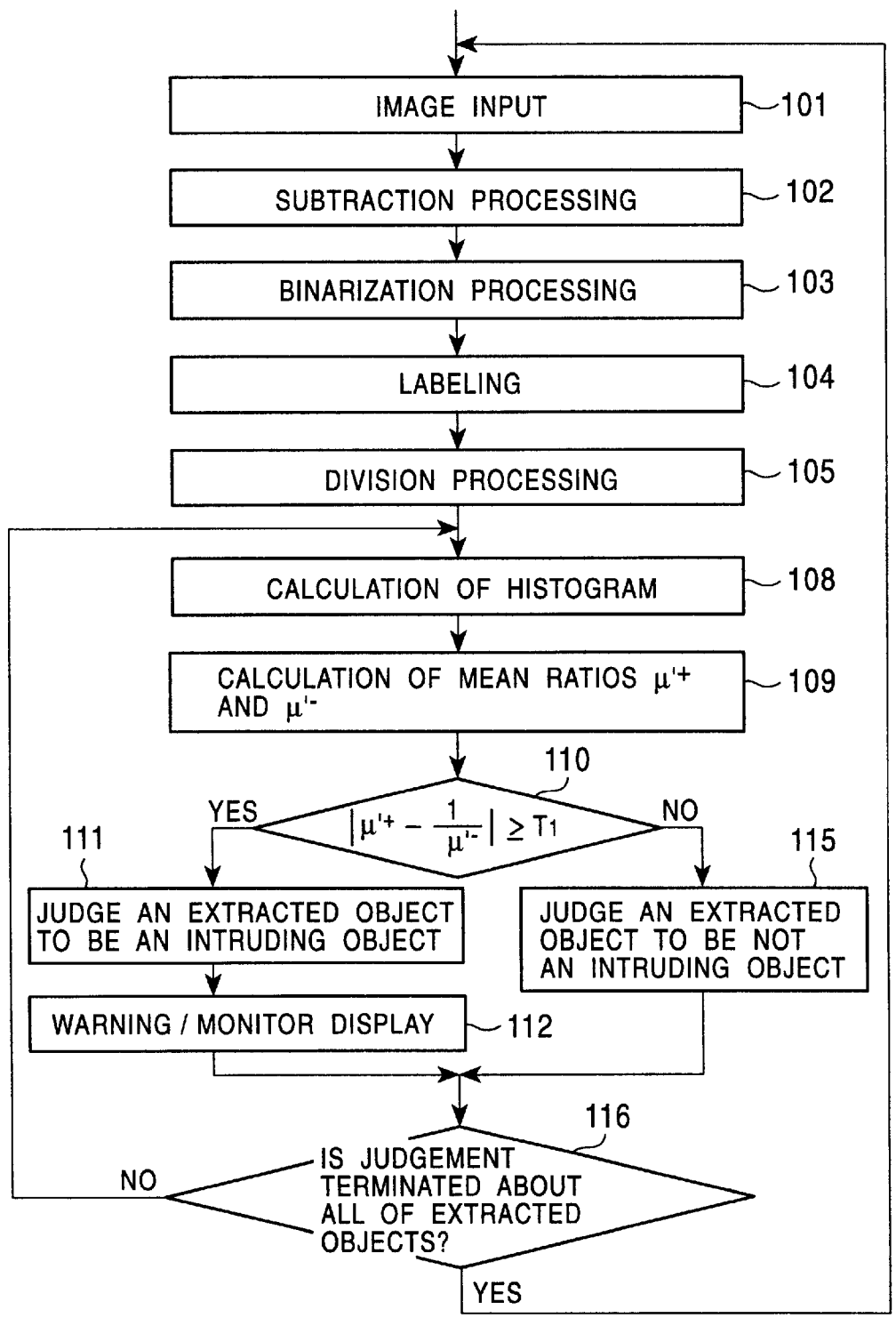
FIG. 2 is a flow chart of an intruding object detecting method according to a first embodiment of the present invention.

FIG. 2 is a flow chart showing an intruding object detecting method according to a first embodiment of the present invention. This first embodiment provides a method in which an extracted object is judged to be an intruding object to be detected or a non-intruding object such as a shadow, from a histogram of a ratio image between an input image and a reference background image, on the basis of a mean value of luminance change ratios in pixels where the input image has turned brighter than the reference background image and a mean value of luminance change ratios in pixels where the input image has turned darker than the reference background image. The flow of the processing will be described with reference to FIG. 6, FIGS. 7A–7C, FIG. 8, FIGS. 9A–9B and FIGS. 10A–10B. In an image input step 101, an input image 601, for example, corresponding to a pixel number of 320 pix by 240 pix, is obtained by the TV camera 501. In the example of FIG. 6, the input image 601 includes an intruding object 609. Next, in a subtraction processing step 102 (corresponding to the subtractor 605 in FIG. 6), a difference in luminance value between the input image 601 and a reference background image 602 stored beforehand in the image memory 503 is calculated for every pixel so as to obtain a difference image 603. In the example of FIG. 6, the difference image 603 includes an area 610 corresponding to the intruding object 609. In a binarization processing step 103, the difference image 603 is subjected to threshold value processing (corresponding to the binarizer 606 in FIG. 6). Accordingly, the luminance value of every pixel not smaller than a predetermined threshold value (for example, Th=20) is converted into "255" as a portion where an object exists, while the luminance value of every pixel smaller than the threshold value is converted into "0" as a portion where an object does not exist. Thus, a binarized image 604 is obtained. Hereinafter, the input image, the reference background image and the binarized image are expressed by f(x,y), g(x,y) and b(x,y), respectively. The coordinates (x,y) expresses a pixel position. For example, in the binarized image 604 in FIG. 6, the horizontal direction is an x-axis (the right direction is a + direction), the vertical direction is a y-axis (the down direction is a + direction), the origin (0,0) is located in the left uppermost, and the coordinates (320,240) is located in the right lowermost. In a labeling processing step 104, in the binarized image 604, areas 611 each of which is a mass of individual pixels taking the luminance value of "255" are numbered by the method of labeling, and detected as extracted objects, respectively. Next, in a division processing step 105, division in luminance value between the input image 601 and the reference background image 602 is made for every pixel. A ratio image r(x,y) obtained by this processing is calculated by:

$$r(x,y) = \begin{cases} [128 \times f(x,y)/g(x,y)] & \left(g(x,y) \neq 0, \text{ AND } \frac{f(x,y)}{g(x,y)} < 2.0\right) \\ 255 & \left(g(x,y) = 0, \text{ OR } \frac{f(x,y)}{g(x,y)} \geq 2.0\right) \end{cases}$$

Here, the ratio image r(x,y) takes the value of "128" if f(x,y) and g(x,y) takes the same value (that is, the division result is "1.0"). Thus, the values of the division result in a range of from "0.0" to "2.0" can be expressed by use of luminance values (pixel values) in a range of from "0" to "255" on the ratio image r(x,y). The symbol [ ] represents rounding off decimal fraction (omission of the figures below the first decimal place) so as to obtain an integer. That is, the ratio image, r(x,y) expresses the ratio of luminance change for each pixel and when the value of r(x,y) is in a range of from 0 to 127, it shows an area of the input image where the input image has turned darker than the reference background image. On the other hand, when the value of r(x,y) is in a range of from 128 to 255, it shows an area of the input image where the input image has turned brighter than the reference background image. Next, in a histogram calculating step 108, a histogram of the ratio image r(x,y) is calculated upon each of the extracted objects numbered by the labeling processing step 104. This histogram is represented by h(i) (i designates a luminance value (pixel value), and h(i) designates the number of pixels where b(x,y)=255 and r(x,y)=i). Next, in steps 109 and 110, the symmetry of the peaks appearing in this histogram is compared or the histogram is used for estimation to judge the extracted object to be an intruding object or not. That is, first, in the mean ratio calculating step 109, a first mean luminance value (pixel value) $\mu^+$ of the ratio image where the luminance value (pixel value) i is in a first range (128≦i≦255) and a second mean luminance value (pixel value) $\mu^-$ of the ratio image where the luminance value (pixel value) i is in a second range (0≦i≦127) are obtained on the basis of the histogram h(i) obtained in the histogram calculating step 108, as follows.

$$\mu^+ = \frac{1}{N^+} \times \sum_{i=128}^{255} \{i \times h(i)\}$$

$$N^+ = \sum_{i=128}^{255} h(i)$$

$$\mu^- = \frac{1}{N^-} \times \sum_{i=0}^{127} \{i \times h(i)\}$$

$$N^- = \sum_{i=0}^{127} h(i)$$

That is, the mean pixel value $\mu^+$ of the ratio image shows a mean pixel value of the ratio image r(x,y) of pixels where b(x,y)=255 and f(x,y)≧g(x,y) (an area of the input image where the input image has turned brighter than the reference background image). On the other hand, the mean pixel value $\mu^-$ of the ratio image shows a mean pixel value of the ratio image r(x,y) of pixels where b(x,y)=255 and f(x,y)<g(x,y) (an area of the input image where the input image has turned darker than the reference background image). Further, in the mean ratio calculating step 109, mean pixel values in ratio representation (hereinafter abbreviated to "mean ratios") $\mu'^+$ and $\mu'^-$ are obtained from the obtained mean pixel values $\mu^+$ and $\mu^-$ of the ratio image, as follows.

$$\mu'^+ = \frac{\mu^+}{256} \times 2.0$$

$$\mu'^- = \frac{\mu^-}{256} \times 2.0$$

Next, in the mean ratio estimating step 110, an absolute value $|\mu'^+ - 1/(\mu'^-)|$ of a difference between the mean ratio ($\mu'^+$) and the reciprocal $1/(\mu'^-)$ of the mean ratio ($\mu'^-$) obtained in the mean ratio calculating step 109 is calculated. If the absolute value is not smaller than a predetermined threshold value $T_1$, the processing branches to an intruding object processing step 111. If the absolute value is smaller than the predetermined value $T_1$, the processing branches to a non-intruding object processing step 115. The processing from the step 105 to the step 110 will be described with reference to FIGS. 7A–7C, FIG. 8, FIGS. 9A–9B, and FIGS. 10A–10B.

Figure 7A:
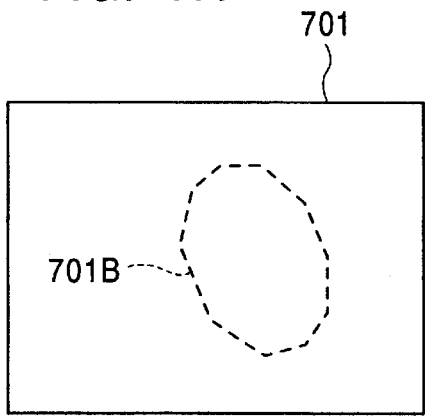
FIGS. 7A to 7C are views which are useful in explaining the characteristics of shadows of trees, flags, or the like, trembling in the wind.
Figure 7B:
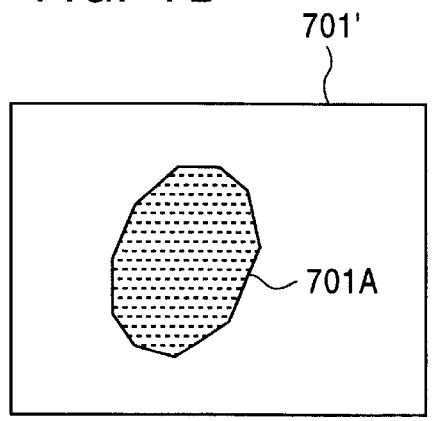
Figure 7C:
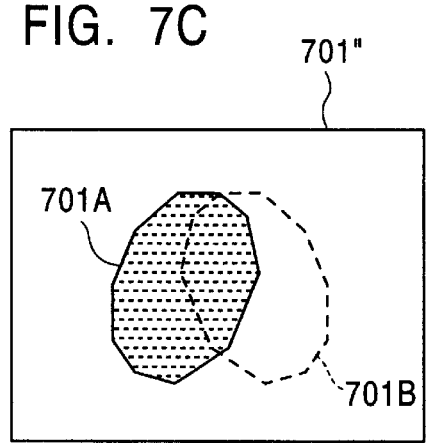

FIGS. 7A–7C, FIG. 8, FIGS. 9A–9B, and FIGS. 10A–10B are views for explaining the characteristics of shadows of trees or flags trembling in the wind, showing such movement of a shadow trembling in the wind by way of simplification for explanation. In FIG. 7B, an area 701A is in the position of a shadow before the wind blows, and an image 701' is a partial image where the shadow is taken. That is, the image 701' corresponds to the reference background image 602 in FIG. 6. On the other hand, an area 701B in an image 701 in FIG. 7A is in the position where the shadow has been moved by the wind. The area 701B is a partial image of the shadow which is taken in the image 701. That is, the image 701 corresponds to the input image 601 in FIG. 6. In such a manner, for example, the image 701' before the wind blows is used as a reference background image, and the image 701 after the wind has blown is used as an input image. An image 701" in FIG. 7C is a view showing the positional relationship between the areas 701B and 701A taken in the images 701 and 701' respectively.

Figure 8:
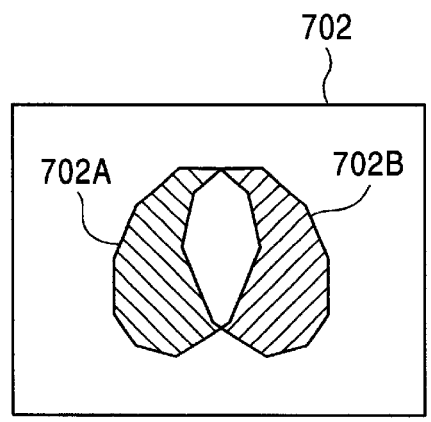
FIG. 8 is another view which is useful in explaining shadows of trees, flags, or the like, trembling in the wind.

If the subtracting method is applied to such a circumstance, a binarized image 702 is obtained as shown in FIG. 8. In the binarized image in FIG. 8, an area 702A shows an area which has turned bright because the shadow has disappeared due to blowing of the wind, and an area 702B shows an area which has turned dark because the shadow has appeared due to the blowing of the wind. The shadows of trees, flags, or the like, trembling in the wind, has a characteristic that two areas are detected as a pair as shown in the binarized image 702.

That is, in the case where an object is detected and extracted by the subtraction method because an image originally taken as the reference background image has moved, there are extracted two areas: for example, an area (702A in FIG. 8 which will be described later) where an originally dark area has turned bright because the shadow has moved therefrom; and an area (702B in FIG. 8 which will be described later) where an originally bright area has turned dark because the shadow has moved thereto. At this time, the pixel values of these two areas are substantially equal to each other on the ratio image.

Figure 9A:
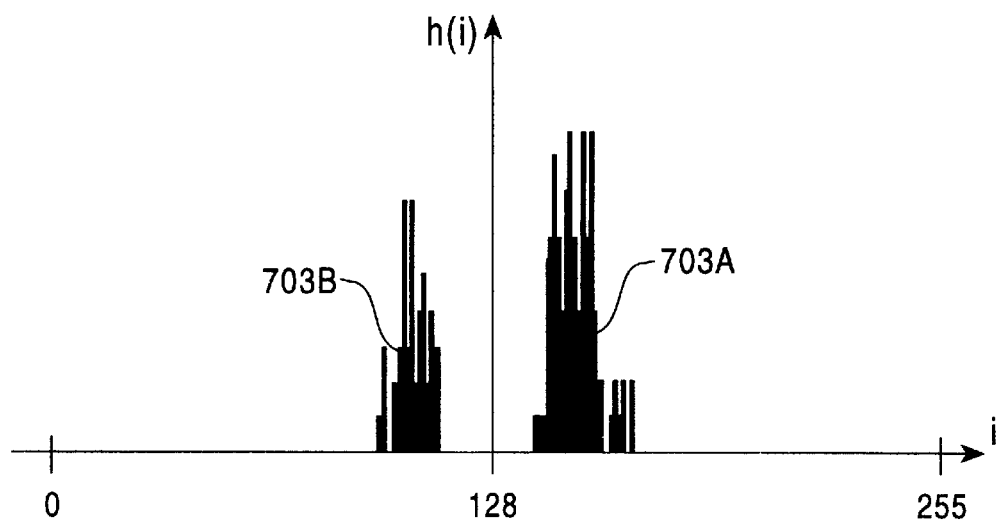
FIG. 9A is a view of an example of a histogram of shadows of trees, flags, or the like, trembling in the wind.
Figure 9B:
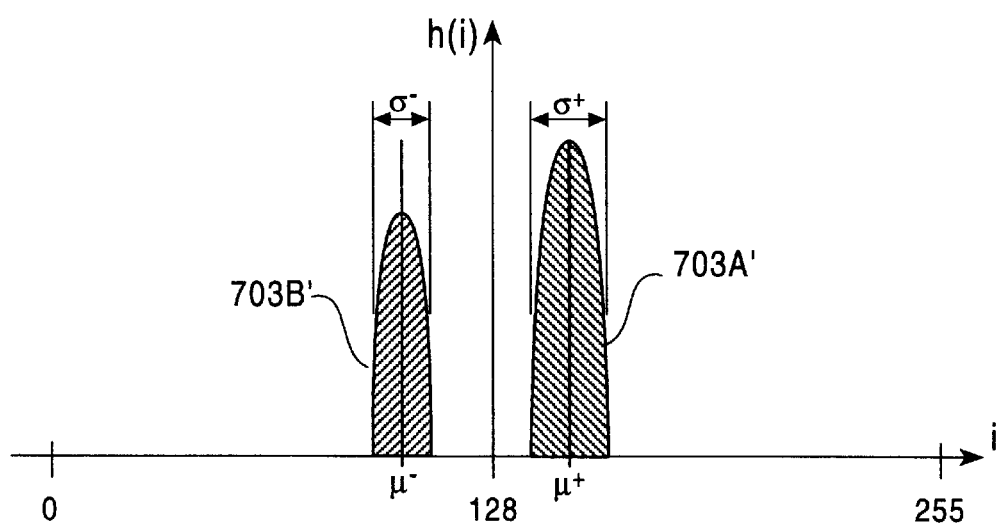
FIG. 9B is a schematic view of the histogram in FIG. 9A, for explaining the characteristics of shadows of trees, flags, or the like, trembling in the wind.

Therefore, for example, a histogram about an object extracted due to the shadows of trees, flags, or the like, trembling in the wind, is calculated as shown in FIG. 9A. FIG. 9B represents an outline of the histogram of FIG. 9A. In FIGS. 9A and 9B, the abscissa designates the pixel value i, and the ordinate designates a frequency h(i). In FIG. 9A, a histogram 703A is derived from the area 702A, and a histogram 703B is derived from the area 702B. In FIG. 9B, a shadowed portion 703A' is an outline of the histogram 703A, and a shadowed portion 703B' is an outline of the histogram 703B. The area of the shadowed portion 703A' expresses the total quantity of the pixel values in the pixel area where originally dark portions have turned bright, while the area of the shadowed portion 703B' expresses the total quantity of the pixel values in the pixel area where originally bright portions have turned dark. Further, the position $\mu^+$ on the abscissa expresses a mean pixel value in the pixel area where originally dark portions have turned bright, while the position $\mu^-$ on the abscissa expresses a mean pixel value in the pixel area where originally bright portions have turned dark. In addition, the symbol $\sigma^+$ represents the width of the shadowed portion 703A', and the symbol $\sigma^-$ represents the width of the shadowed portion 703B'. Thus, the pixel value change ratio ($\mu'^+$) in the pixels which have turned bright because the shadow has disappeared due to the wind takes a value close to that of the pixel value change ratio ($1/\mu'^-$) in the pixels which have turned dark because the shadow has appeared.

Figure 10A:
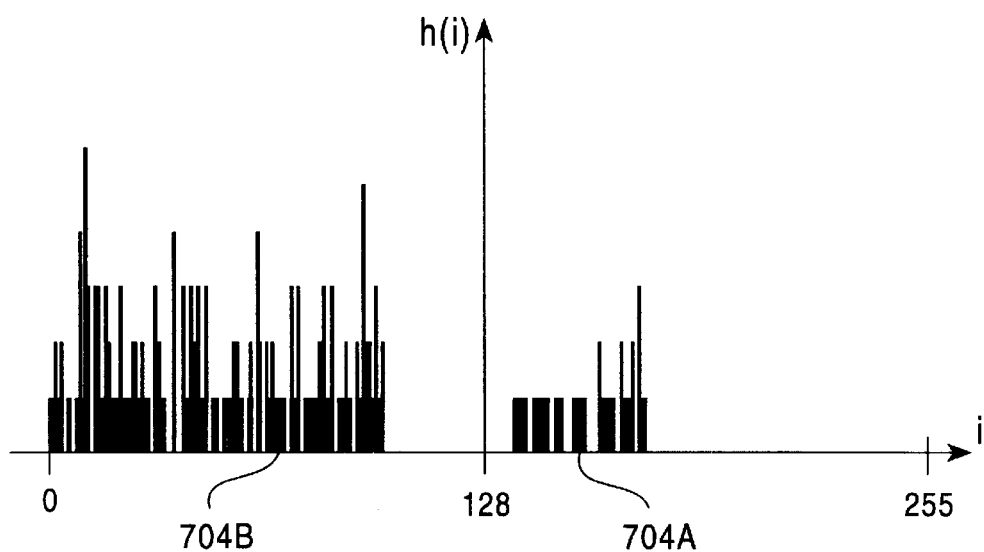
FIG. 10A is a view of an example of a histogram of an intruding object.
Figure 10B:
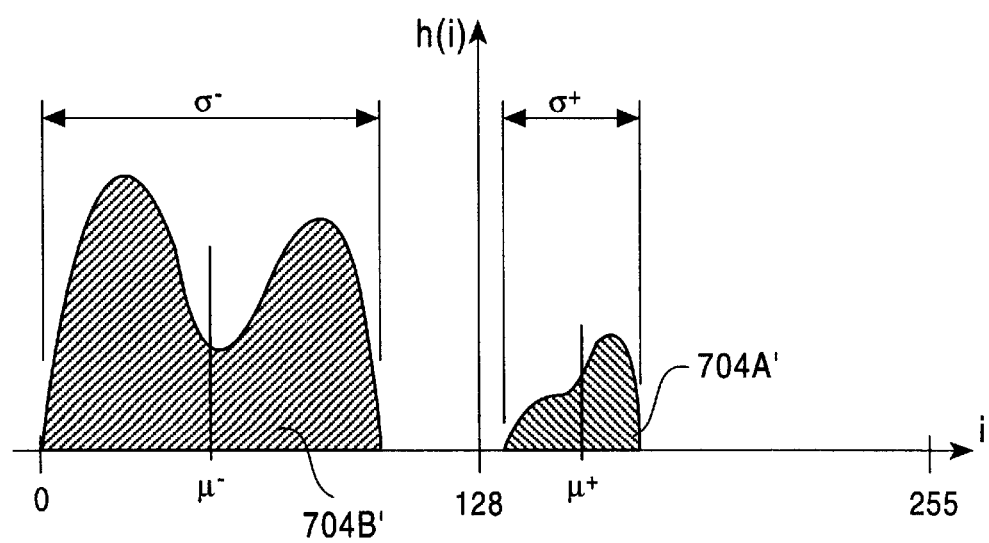
FIG. 10B is a schematic view of the histogram in FIG. 10A, for explaining the characteristics of an intruding object.

On the other hand, a histogram of a ratio image of an object detected due to an intruder is, for example, as shown in FIGS. 10A and 10B. The histogram in FIGS. 10A and 10B is different from the histogram, in FIGS. 9A and 9B, of the ratio image of the object detected due to the shadows of trees, flags, or the like, trembling in the wind. In the FIGS. 10A and 10B, the histogram in a portion of i<128 has a shape different from that of the histogram in a portion of i≧128 (in FIGS. 10A and 10B, the histogram has distribution in a range of from about 70 to about 115 in the portion of i<128, and in a range of from about 155 to about 235 in the portion of i≧128). As shown in this example, the histogram of the ratio image of the object detected due to an intruder is different from the histogram of the detected object extracted due to the shadows of trees, flags, or the like, trembling in the wind, and does not always have similar distribution between the portion of i<128 and the portion of i≧128. That is, in accordance with the luminance distribution belonging to the intruder, there is no particular feature in the histogram of the detected object extracted due to the intruder.

Therefore, by comparing the mean ratio $\mu'^+$ of pixels which have turned bright with the reciprocal of the mean ratio $\mu'^-$ of pixels which have turned dark in the histogram of the ratio image, judgement is made as to whether the detected object is due to an intruding object to be detected or due to a moving shadow.

For example, the threshold value $T_1$ used for the judgement is 0.1 in the case where a divergence in mean ratio is allowed within 10% of the change ratio of the luminance change or pixel value change.

Succeedingly, when the extracted object is judged to be an intruding object in the mean ratio estimating step 110, the extracted object is regarded as an intruder in the intruding object processing step 111, and the CPU 505 supplies a command to the output I/F 507 and the image output I/F 508 in the following warning/monitor display step 112. In response to this command, the output I/F 507, for example, turns on the warning light 510 indicating a warning, while the image output I/F 508, for example, makes a display indicating a warning on the monitor 511. On the other hand, when the extracted object is judged to be a shadow in the mean ratio estimating step 110, the extracted object is regarded as a shadow in the non-intruding object processing step 115. A termination judging step 116 makes the processing branch to the image input step 101 if the processing from the step 108 to the step 115 has been applied to all the extracted objects. If not so, the termination judging step 116 makes the processing branch to the histogram calculating step 108. As has been described above, according to this embodiment, a histogram of a ratio image between an input image of any object extracted by the subtraction method and a reference background image is estimated, and the luminance value change ratio of pixels which have turned bright is compared with the luminance value change ratio of pixels which have turned dark. Thus, judgement is made as to whether the extracted object is an intruding object to be detected or a shadow. As a result, even in the condition that there are shadows of trees, flags, or the like, trembling in the wind, in the field of view, accurate judgement can be made as to whether the extracted object is an intruding object to be detected or not.

Figure 3:
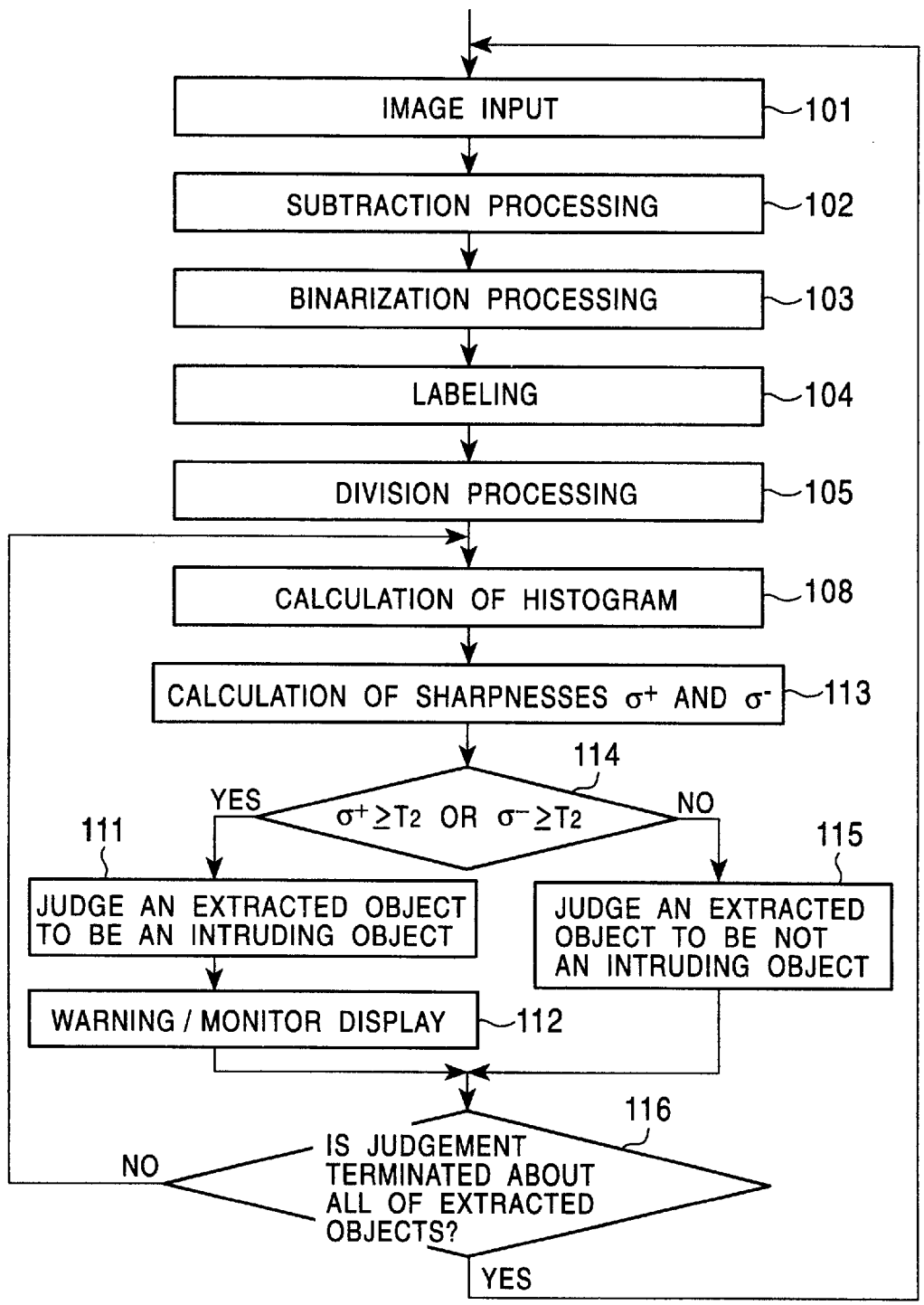
FIG. 3 is a flow chart of an intruding object detecting method according to a second embodiment of the present invention.

A second embodiment of the present invention will be described with reference to FIG. 3. The second embodiment provides a method in which judgement can be made as to whether a detected object is an intruding object to be detected or a shadow, on the basis of the scattering of the distribution in a histogram obtained in the histogram calculating step 108. In the flow chart of FIG. 3, a sharpness calculating step 113 and a sharpness estimating step 114 are added to the flow chart of FIG. 2, in place of the mean ratio calculating step 109 and the mean ratio estimating step 110 in FIG. 2, respectively. The histogram obtained in the step 108 is estimated from a view point different from that in the first embodiment (that in FIG. 2) so as to judge an extracted object to be an intruding object to be detected or not. In FIG. 3, a histogram h(i) is calculated through processing steps similar to those in FIG. 2. Based on the histogram h(i) obtained in the histogram calculating step 108, a pair of sharpnesses a $\sigma^+$ and $\sigma^-$ are obtained in the sharpness calculating step 113 as follows.

$$\sigma^+ = \sqrt{\frac{1}{N^+} \times \sum_{i=128}^{255} \{h(i) \times i^2\} - (\mu^+)^2}$$

$$\sigma^- = \sqrt{\frac{1}{N^-} \times \sum_{i=0}^{127} \{h(i) \times i^2\} - (\mu^-)^2}$$

That is, the sharpness $\sigma^+$ of a ratio image expresses a standard deviation of pixel value distribution on a ratio image r(x,y) of pixels where b(x,y)=255 and f(x,y)≧g(x,y), while the sharpness $\sigma^-$ of the ratio image expresses a standard deviation of pixel value distribution on a ratio image r(x,y) of pixels where b(x,y)=255 and f(x,y)<g(x,y). Next, in the sharpness estimating step 114, the sharpnesses $\sigma^+$ and $\sigma^-$ a obtained in the sharpness calculating step 113 are compared with a predetermined threshold value $T_2$ respectively. If at least one of the two sharpnesses is not smaller than the threshold value, the processing branches to the intruding object processing step 111. If both the sharpnesses $\sigma^+$ and $\sigma^-$ a are smaller than the threshold value $T_2$, the processing branches to the non-intruding object processing step 115.

This processing will be described with reference to FIG. 8, FIGS. 9A–9B and FIGS. 10A–10B. As described above, shadows of trees, flags, or the like, trembling in the wind, have a characteristic that two areas are detected as a pair as shown in the binarized image 702. Further, there is another characteristic that pixels in the area which has turned bright because a shadow has disappeared due to blowing of the wind have a substantially fixed luminance change ratio, and pixels in the area which has turned dark because a shadow has appeared also have a substantially fixed luminance change ratio. That is, the spread (that is, standard deviation) of luminance (pixel) values on a ratio image is reduced in each area.

On the other hand, in a detected object due to an intruder, the spread of luminance values (pixel values) on a ratio image is not always reduced as described above. Therefore, by estimating the sharpness $\sigma^+$ of pixels which have turned bright and the sharpness $\sigma^-$ of pixels which have turned dark in the histogram of the ratio image by use of the threshold value $T_2$, it is possible to judge whether the extracted object is due to an intruding object to be detected or from a non-intruding object, for example, from a moving shadow. For example, in the case where a scattering in sharpness is allowed within 15% of the luminance change ratio, the ratio image expresses a range of from 0 to 2.0 by 256 gradations, and the threshold value $T_2$ used for the judgement is therefore set as follows.

$$T_2 = \frac{256}{2.0} \times \frac{15}{100} \approx 19$$

At this time, if the sharpness takes a value smaller than $T_2$, it means that the pixel values of the ratio image are included in a range of:

$(\mu^+ - T_2) < i < (\mu^+ + T_2)$ $(\mu^- - T_2) < i < (\mu^- + T_2)$ so that the extracted object is a shadow (the steps 114 and 115 in FIG. 3). According to this embodiment, a histogram of a ratio image between an input image of any object to be detected by the subtraction method and a reference background image is obtained, and the spread of distribution on the ratio image of pixels which have turned bright or dark is compared with the threshold value $T_2$. Thus, judgement can be made as to whether the extracted object is an intruding object to be detected or a shadow. As a result, even in the condition that there are shadows of trees, flags, or the like, trembling in the wind, in the field of view, accurate judgement can be made as to whether the extracted object is an intruding object to be detected or not.

A third embodiment of the present invention will be described with reference to FIG. 4. The third embodiment provides a method in which judgement is made as to whether an extracted detected object is an intruding object to be detected or not, on the basis of a mean value of luminance change ratios in pixels where the input image has turned brighter than the reference background image, a mean value of luminance change ratios in pixels where the input image has turned darker than the reference background image, and the spread of distribution on a histogram obtained in the histogram calculating step 108.

Figure 4:
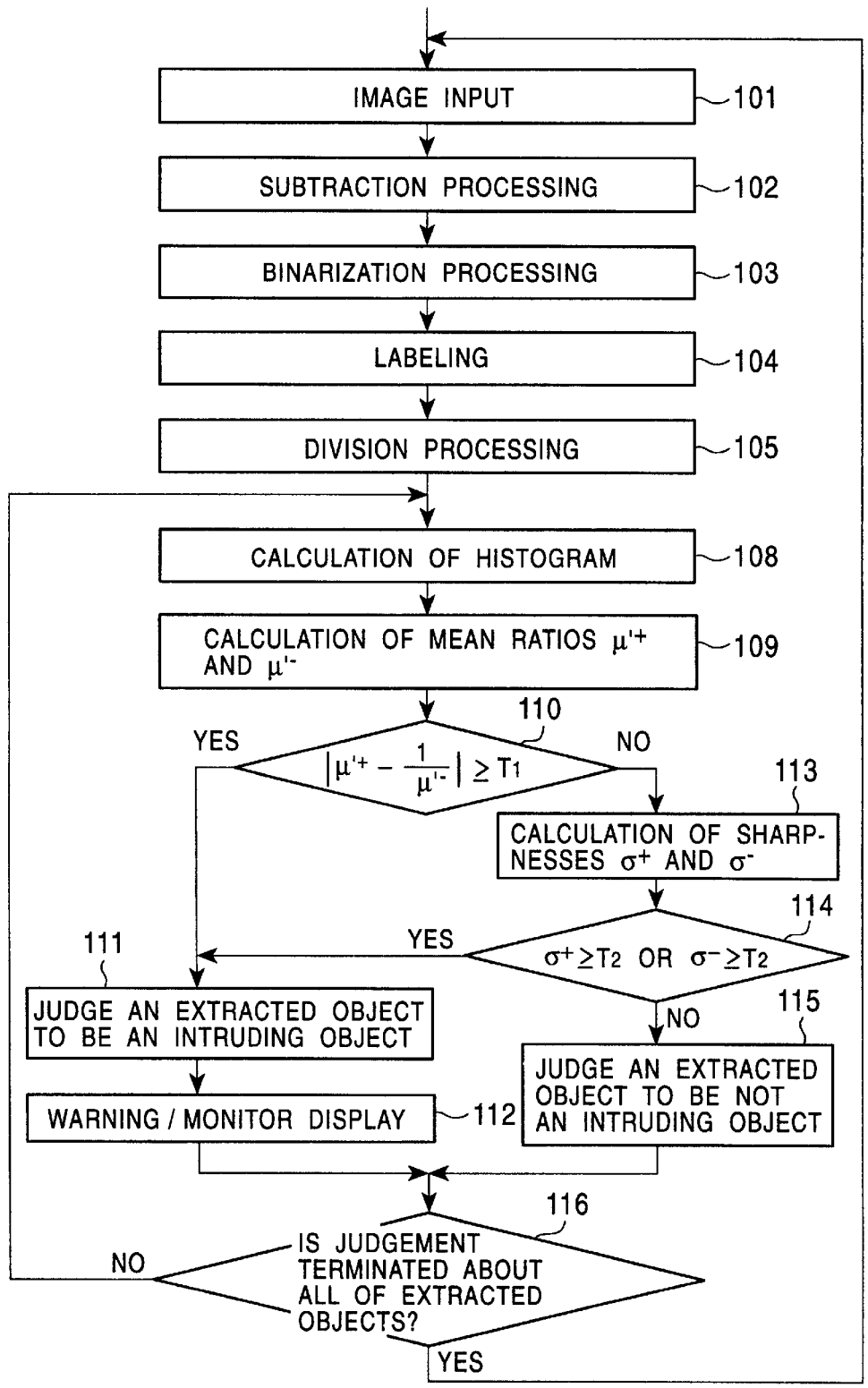
FIG. 4 is a flow chart of an intruding object detecting method according to a third embodiment of the present invention.

The flow chart of FIG. 4 is arranged so that the sharpness calculating step 113 and the sharpness estimating step 114 described above are executed when the difference between the means ratios $\mu'^+$ and reciprocal of $\mu'^-$ is judged to be smaller than $T_1$ in the mean ratio estimating step 110 in the flow chart of FIG. 2. Therefore, according to this embodiment, a histogram of a ratio image between an input image of any object extracted by the subtraction method and a reference background image is obtained, and the luminance (pixel) value change ratio in pixels which have turned bright is compared with the luminance (pixel) value change ratio in pixels which have turned dark. Further, the spread of distribution on the ratio image of the pixels which have turned bright and the spread of distribution on the ratio image of the pixels which have turned dark are compared with the threshold value $T_2$. Thus, judgement is made as to whether the extracted object is an intruding object to be detected or a shadow. As a result, even in the condition that there are shadows of trees, flags, or the like, trembling in the wind, in the field of view, accurate judgement can be made as to whether the extracted object is an intruding object to be detected or a shadow.

Figure 5:
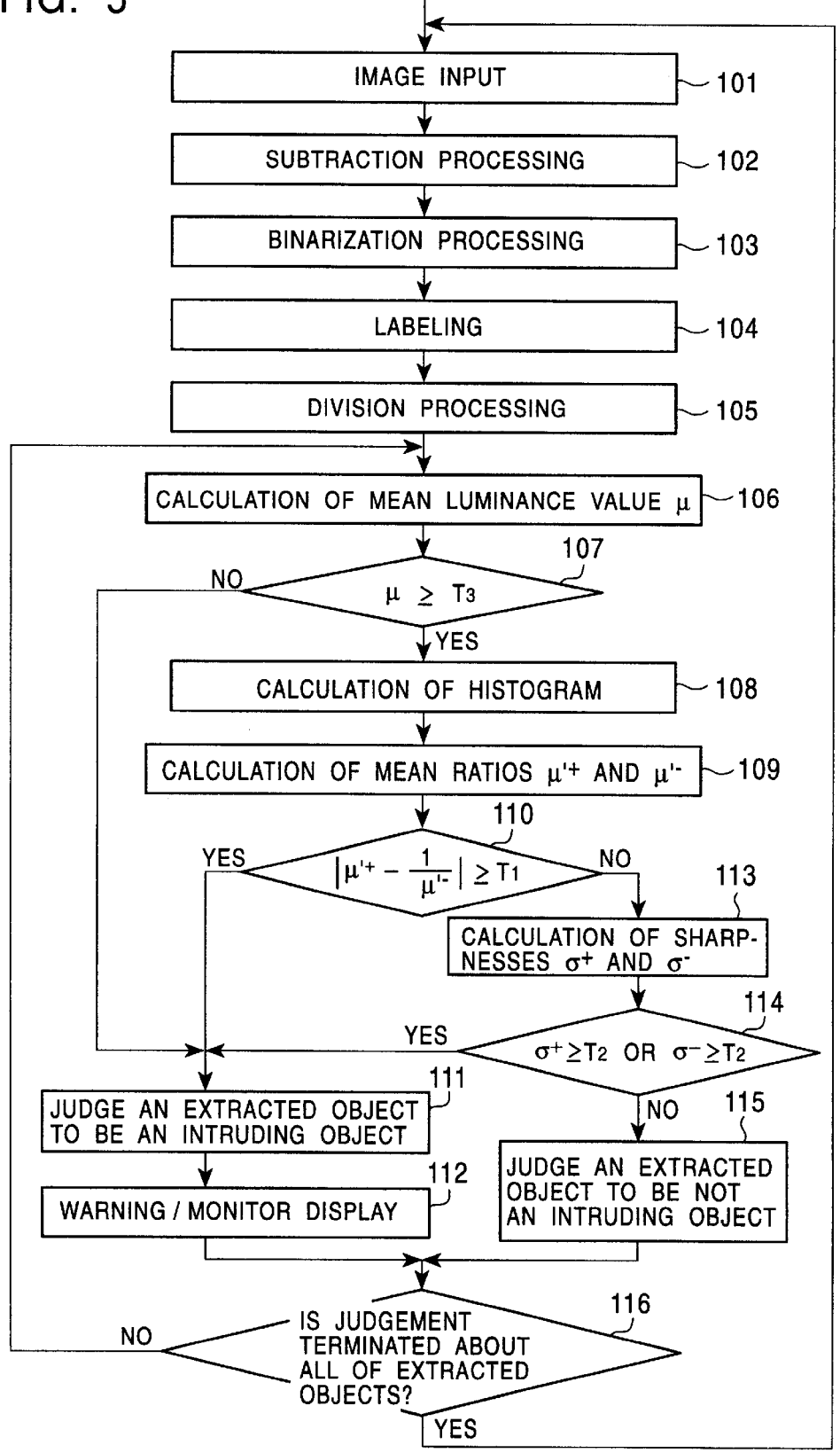
FIG. 5 is a flow chart of an intruding object detecting method according to a fourth embodiment of the present invention.

A fourth embodiment of the present invention will be described with reference to FIG. 5. The fourth embodiment provides a method in which the steps 108 to 110, 113 and 114 in the aforementioned third embodiment are executed only when the mean luminance value of an extracted object is not smaller than a predetermined threshold value $T_3$. In other words, the embodiment is arranged so that judgement is not made as to whether or not an extracted object is an intruding object to be detected in an area which is dark already due to the shadow of a building or the like so that another shaking shadow is impossible to occur. In the flow chart of FIG. 5, a mean luminance value calculating step 106 and a mean luminance value estimating step 107 are added to the flow chart of FIG. 4 after the division processing step 105. In the mean luminance value calculating step 106, a mean luminance value is calculated on pixels which have a label number of interest and which are in the relation b(x,y)=255. That is, calculation is made according to the expression:

$$\mu = \frac{1}{N} \times \sum_{(x,y)|b(x,y)=255} f(x, y)$$

Here, N represents the number of pixels where b(x,y)=255. Next, in the mean luminance value estimating step 107, the mean luminance value $\mu$ obtained in the mean luminance value calculating step 106 is compared with the predetermined threshold value $T_3$. If the mean luminance value $\mu$ is not smaller than the threshold value $T_3$, the processing branches to the histogram calculating step 108. If the mean luminance value a is smaller than the threshold value $T_3$, the processing branches to the intruding object processing step 111. Here, the threshold value $T_3$ is set to be equal to the mean luminance value of an input image in the circumstance where a shaking shadow appears, for example, $T_3$ is set to be 128. In such a manner, judgement can be made as to whether an extracted object is an intruding object to be detected or a shadow only in the area which has a luminance distribution bright enough for a shaking shadow to appear. Thus, the speed of the processing can be increased.

A fifth embodiment of the present invention will be described with reference to FIG. 11. This embodiment is arranged so that the threshold value $T_2$ for sharpness in the third embodiment shown in FIG. 4 is changed to change the determination/recognition rate as to whether an extracted object is an intruding object to be detected or not. FIG. 11 shows a change 801A of the rate (erroneous recognition rate) with which an extracted non-intruding object is judged to be an intruding object, and a change 801B of the rate (missing rate) with which an intruding object is judged to be not an intruding object, in the case where $T_2$ is changed. These changes are obtained empirically in the case where the monitoring environment (kinds of target objects, focal length of a camera lens, etc.) is determined. As apparent from FIG. 11, the erroneous recognition rate can be reduced when the threshold value $T_2$ for sharpness is set to be large, and conversely the missing rate can be reduced when the threshold value $T_2$ for sharpness is set to be small. Therefore, by setting $T_2$ corresponding to allowance for erroneous recognition or allowance for missing in accordance with a target to be monitored, it is possible to adjust the determination/recognition rate as to whether an extracted object is an intruding object to be detected or not.

A sixth embodiment of the present invention will be described with reference to FIG. 12. In this embodiment, the intruding object processing step 111 and the not-intruding object processing step 115 in the aforementioned third embodiment (FIG. 4) are replaced by an intruding object candidate processing step 901 and a non-intruding object candidate processing step 902 respectively, and a determination rate calculating step 903 and a determination rate estimating step 904 are added. In the intruding object candidate processing step 901, when an extracted object is judged to be an intruding object in the mean ratio estimating step 110 or the sharpness estimating step 114, the detected object is not directly judged to be an intruding object but stored in the work memory 504 as a candidate for an intruding object. On the other hand, in the non-intruding object candidate processing step 902, when an extracted object is judged to be a shadow in the sharpness estimating step 114, the extracted object is not directly judged to be a shadow but stored in the work memory 504 as a candidate for a shadow. Next, in the determination rate calculating step 903, a determination rate k (k=N1/Nk) is calculated on the basis of the number of times N1 with which the extracted object stored in the work memory 504 was judged to be an intruding object candidate in Nk past frames. Next, in the determination rate estimating step 904, the determination rate k obtained in the determination rate calculating step 903 is compared with a predetermined threshold value $T_4$. If the determination rate k is not smaller than the threshold value $T_4$, the processing branches to the warning/monitor display step 112. If the determination rate k is smaller than the threshold value $T_4$, the processing branches to the termination judging step 116. Here, the determination rate k expresses a rate with which the extracted object was judged to be an intruding object candidate in Nk past frames. If the extracted object is an intruding object, the determination rate k becomes large (k=1.0 in the case where it was judged to be an intruding object candidate in all the frames). If the extracted object is due to a shaking shadow, the determination rate k becomes small (k=0.0 in the case where it was judged to be a shadow candidate in all the frames). The number of frames Nk for the determination, and the threshold value $T_4$ for the determination rate are values set empirically, for example, Nk and $T_4$ are set to be 10 and 0.5 respectively. In this case, an extracted object which was judged to be an intruding object candidate in 5 or more frames for 2 seconds is determined as an intruding object on the assumption that the frame processing speed is 5 frames per second. Therefore, according to this embodiment, judgement is made as to whether an extracted object is an intruding object to be detected or a shadow on the basis of the intruding object candidate determination result in several past frames. Accordingly, accurate judgement can be made as to whether the extracted object is an intruding object to be detected or not, even in the condition that there are shadows of trees, flags, or the like, trembling in the wind, in the field of view.

An intruding object detecting method according to a seventh embodiment of the present invention will be described with reference to FIG. 13.

Figure 13:
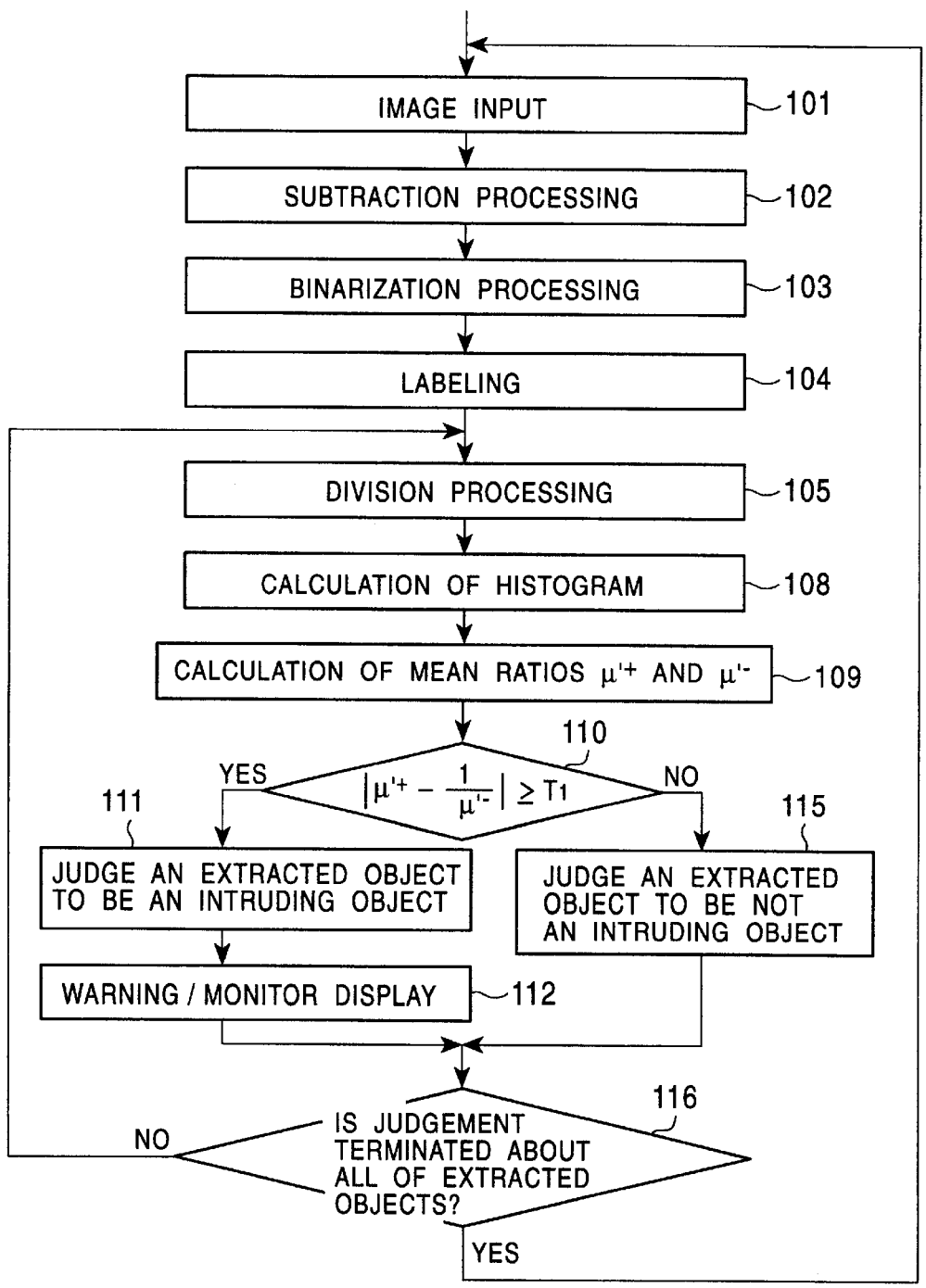
FIG. 13 is a flow chart of an intruding object detecting method according to a seventh embodiment of the present invention.

The intruding object detecting method in FIG. 13 is the same as that in FIG. 2 according to the first embodiment only except that the processing is moved to the division processing step 105 if the conclusion of the step 116 is NO in the flow chart of FIG. 2. Although the division processing of the step 105 was applied to the whole of an image in the method in FIG. 2, division is made only upon individual extracted objects labeled in the step 104 in the method in FIG. 13. Therefore, there is an effect that the amount of processes to be executed for the division can be reduced. Not to say, this method can be applied to other embodiments.

As has been explained, according to the present invention, target objects which exist in the view field of a camera can be detected accurately even in the circumstance where there are moving objects other than intruding objects to be detected, such as shadows of trees, flags, or the like, trembling in the wind. It is therefore possible to widen the application field of an intruding object detecting apparatus on a large scale.

The foregoing disclosure and description of the invention are illustrative and explanatory thereof, and various changes may be made without departing from the scope of the invention. For example, not to say, the present invention can be embodied as a computer program product having a computer usable medium which realizes computer readable program code means for carrying out a method of detecting an intruding object appearing in image signals sequentially supplied from an image pickup apparatus described above. Further, the intruding object candidate processing step 901, the non-intruding object candidate processing step 902, the determination rate calculating step 903, and the determination rate estimating step 904 in FIG. 12 may be applied to other embodiments optionally. Further, the mean luminance value calculating step 106 and the mean luminance value estimating step 107 in FIG. 5 may be applied to other embodiments optionally. In addition, although comparison was made between $\mu^{i+}$ and the reciprocal of $\mu^{i-}$ in the judging step 110 in the intruding object detecting method described with reference to FIG. 2, not to say, comparison may be made between $\mu^{i-}$ and the reciprocal of $\mu^{i-}$.

What is claimed is:

1. An intruding object detecting method comprising the steps of:
    inputting an image signal from an image pickup apparatus;
    extracting a moving object from said image signal and a reference background image signal stored in a memory device by a subtraction method;
    making division between said image signal and said reference background image signal for every pixel so as to produce a ratio image;
    calculating a histogram of pixel values on said ratio image of said moving object extracted from said image signal;
    detecting symmetry of said histogram of the extracted moving object; and
    judging whether said extracted moving object is an intruding object or not, on the basis of detection result of said symmetry of said histogram.

2. An intruding object detecting method according to claim 1, wherein said step of detecting symmetry of said histogram including the steps of:
    calculating mean pixel values in ratio representation on a part of said ratio image corresponding to said extracted image object from said histogram (109); and
    comparing an absolute value of a difference between one of said mean pixel values in ratio representation and a reciprocal of the other mean pixel value in ratio representation with a predetermined threshold value (T1);
    wherein said judging step judges said extracted image object to be an intruding object when comparison result in said comparing step concludes that said absolute value of a difference between one of said mean pixel values in ratio representation and a reciprocal of the other mean pixel value in ratio representation is equal to or larger than said predetermined threshold value (T1), and judges said extracted image object to be not an intruding object when said absolute value is smaller than said predetermined threshold value (T1).

3. An intruding object detecting method according to claim 1, wherein said step of detecting symmetry of said histogram including the steps of:
    calculating sharpnesses of pixel value distribution on a part of said ratio image corresponding to said extracted image object from said histogram; and
    comparing each of said calculated sharpnesses of pixel value distribution with a predetermined threshold value (T2);
    wherein said judging step judges said extracted image object to be an intruding object or not on the basis of comparison result in said comparing step.

4. An intruding object detecting method according to claim 3, wherein said judging step judges said extracted image object to be an intruding object when at least one of said sharpnesses of pixel value distribution is not smaller than said predetermined threshold value (T2).

5. An intruding object detecting method according to claim 3, wherein said judging step judges said extracted image object to be not an intruding object when both of said sharpnesses of pixel value distribution are smaller than said predetermined threshold value (T2).

6. An intruding object detecting method according to claim 3, wherein said predetermined threshold value (T2) is variable.

7. An intruding object detecting method according to claim 1, wherein said step of detecting symmetry of said histogram including:
    a first comparing step of calculating mean pixel values in ratio representation on a part of said ratio image corresponding to said extracted image object from said histogram, and comparing an absolute value of a difference between one of said mean pixel values in ratio representation and a reciprocal of the other mean pixel value in ratio representation with a first predetermined threshold value (T1); and
    a second comparing step of calculating sharpnesses of pixel value distribution on a part of said ratio image corresponding to said extracted image object from said histogram, and comparing each of said calculated sharpnesses of pixel value distribution with a second predetermined threshold value (T2);
    wherein said first comparing step executes said second comparing step when said difference between one mean pixel value in ratio representation and a reciprocal of the other mean pixel value in ratio representation is smaller than said first predetermined threshold value (T1).

8. An intruding object detecting method according to claim 7, wherein said second predetermined threshold value (T2) is variable.

9. An intruding object detecting method according to claim 7, wherein said second comparing step judges said extracted image object to be an intruding object when at least one of said sharpnesses of pixel value distribution is not smaller than said predetermined threshold value (T2).

10. An intruding object detecting method according to claim 7, wherein said second comparing step judges said extracted image object to be not an intruding object when both of said sharpnesses of pixel value distribution are smaller than said predetermined threshold value (T2).

11. An intruding object detecting method according to claim 1, wherein in said step of producing a ratio image, said ratio image is produced with respect to a part of said image signal corresponding to said extracted image object.

12. An intruding object detecting method according to claim 1, further comprising a step of storing judgement result of said step of judging whether said extracted image object is an intruding object or not, and a step of comparing a plurality of past judgement results.

13. An intruding object detecting method according to claim 1, further comprising a step of judging whether a mean pixel value of said part of said image signal corresponding to said extracted moving object is smaller than a predetermined value (T3) or not, and said histogram calculating step is executed about said extracted image object which said mean pixel value is not smaller than said predetermined value (T3).

14. An intruding object detecting method according to claim 1, wherein said step of detecting symmetry of said histogram including the step of:

detecting, from said histogram, symmetry between a first area where a luminance value of said input image is larger than a luminance value of said reference background image and a second area where a luminance value of said input image is larger than a luminance value of said reference background image, with respect to a part of said ratio image corresponding to said extracted moving object.

15. An intruding object detecting method according to claim 14, wherein said step of detecting symmetry of said histogram including the step of:

calculating mean pixel values in ratio representation in said first and second areas on a part of said ratio image corresponding to said extracted moving object from said histogram; and comparing an absolute value of a difference between one of said mean pixel values in ratio representation and a reciprocal of the other mean pixel value in ratio representation with a predetermined threshold value (T1);

wherein said judging step judges said extracted moving object to be an intruding object when said comparing step shows comparison result that said absolute value of a difference between one of said mean pixel values in ratio representation and a reciprocal of the other mean pixel value in ratio representation is equal to or larger than said predetermined threshold value (T1), and judges said extracted moving object to be not an intruding object when said absolute value is smaller than said predetermined threshold value (T1).

16. An intruding object detecting method according to claim 14, wherein said step of detecting symmetry of said histogram including the step of:

calculating sharpnesses of pixel value distribution in said first and second areas on a part of said ratio image corresponding to said extracted moving object from said histogram; and comparing each of said pair of calculated sharpnesses of pixel value distribution with a predetermined threshold value (T2);

wherein said judging step judges whether said extracted moving object is an intruding object or not on the basis of comparison result in said comparing step.

17. An intruding object detecting method according to claim 14, wherein said step of detecting symmetry of said histogram including:

a first comparing step of calculating mean pixel values in ratio representation in said first and second areas on a part of said ratio image corresponding to said extracted moving object from said histogram, and comparing an absolute value of a difference between one of said mean pixel values in ratio representation and a reciprocal of the other mean pixel value in ratio representation with a first predetermined threshold value (T1);

a second comparing step of calculating sharpnesses of pixel value distribution in said first and second areas on a part of said ratio image corresponding to said extracted moving object from said histogram, and comparing each of said two calculated sharpnesses of pixel value distribution with a second predetermined threshold value (T2);

wherein said first comparing step executes said second comparing step when said absolute value of a difference between one of said mean pixel values in ratio representation and a reciprocal of the other mean pixel value in ratio representation is smaller than said first predetermined threshold value (T1).

18. An intruding object detecting method comprising the steps of:

inputting an image signal from an image pickup apparatus;

extracting a moving object from said image signal and a reference background image signal stored in a memory device by a subtraction method;

making division between said image signal and said reference background image signal for every pixel so as to produce a ratio image;

calculating a histogram of pixel values on said ratio image of said moving object extracted from said image signal;

calculating sharpnesses of pixel value distribution on a part of said ratio image corresponding to said extracted moving object from said calculated histogram;

comparing each of said calculated sharpnesses with a predetermined threshold value (T2); and judging whether said extracted moving object is an intruding object or not on the basis of detection result of said sharpnesses.

19. An intruding object detecting method according to claim 18, wherein said judging step judges said extracted moving object to be an intruding object when at least one of said sharpnesses of pixel value distribution is not smaller than said predetermined threshold value (T2).

20. An intruding object detecting method according to claim 18, wherein said judging step judges said extracted moving object to be not an intruding object when both of said sharpnesses of pixel value distribution are smaller than said predetermined threshold value (T2).

21. An intruding object detecting method according to claim 18, wherein in said step of producing a ratio image, said ratio image is produced with respect to a part of said image signal corresponding to said extracted moving object.

22. An intruding object detecting method according to claim 18, further comprising a step of judging whether a mean pixel value of said part of said image signal corresponding to said extracted moving object is smaller than a predetermined value (T3) or not, and said histogram calculating step is executed about said extracted image object which said mean pixel value is not smaller than said predetermined value (T3).

23. An intruding object detecting method according to claim 18, further comprising a step of storing judgement result of said judging step, and a step of comparing a plurality of past judgement results, and stored;

wherein said extracted moving object is judged to be an intruding object or not on the basis of comparison result of said past judgement results.

24. An intruding object detecting apparatus comprising:

an image pickup device for generating an image signal to detect an intruding object in a field to be monitored; and an image processor for receiving said image signal;

wherein said image processor comprising:

a moving object extracting unit for extracting a moving object from said image signal and a reference background image signal stored in a memory device by a subtraction method;

a ratio image producing unit for generating a ratio image by making division between said image signal and said reference background image signal;

a histogram producing unit for producing a histogram of pixel values on said ratio image of said extracted moving object;

a detecting unit for detecting symmetry of said histogram of the extracted moving object; and a decision unit for deciding whether said extracted moving object is an intruding object or not on the basis of detection result of said symmetry of said histogram.

25. A computer program product comprising: a computer usable medium having computer readable program code means embodied in said medium for detecting an intruding object appearing in an image signal supplied from an image pickup device, said computer readable program code means comprising:

means for applying a subtraction method to said image signal and a reference background image signal stored in a memory device to extract an moving object;

means for making division between said image signal and said reference background image signal so as to produce a ratio image;

means for producing a histogram of pixel values on said ratio image of said extracted moving object from said ratio image;

means for calculating at least one of mean pixel values in ratio representation and sharpnesses of pixel value distribution about said extracted moving object from said histogram;

means for comparing said calculated mean pixel values in ratio representation and/or said calculated sharpnesses with a predetermined threshold value; and means for judging whether said extracted moving object is an intruding object or not, on the basis of comparison result obtained by said comparing means.

26. An intruding object detecting method comprising the steps of:

inputting an image signal from an image pickup device;

extracting a moving object from said image signal and a reference background image signal stored in a memory device by a subtraction method;

making division between said image signal and said reference background image signal for every pixel so as to produce a ratio image;

calculating a histogram of pixel values on a part of said ratio image corresponding to said moving object extracted from said image signal;

calculating mean pixel values in ratio representation on a part of said ratio image corresponding to said extracted moving object from said calculated histogram;

comparing said mean pixel values in ratio representation; and judging whether said extracted moving object is an intruding object on the basis of comparison result of said mean pixel values in ratio representation.

27. An intruding object detecting method according to claim 26, wherein said comparing step including the steps of:

calculating mean pixel values in ratio representation on a part of said ratio image corresponding to said extracted moving object from said histogram; and comparing an absolute value of a difference between one of said mean pixel value in ratio representation and a reciprocal of the other mean pixel value in ratio representation with a predetermined threshold value (T1);

wherein said judging step judges that said extracted object is an intruding object when said comparing step shows comparison result that said absolute value of a difference between one of said mean pixel values in ratio representation and a reciprocal of the other mean pixel value in ratio representation is equal to or larger than said predetermined threshold value (T1), and judges that said extracted object is not an intruding object when said comparing step indicates that said absolute value is smaller than said predetermined threshold value (T1).

28. An intruding object detecting method according to claim 26, wherein in said step of producing a ratio image, said ratio image is produced with respect to a part of said image signal corresponding to said extracted moving object.

29. An intruding object detecting method according to claim 26, further comprising a step of judging whether a mean pixel value of a part of said image signal corresponding to said extracted moving object is smaller than a predetermined value (T3) or not, and said histogram calculating step is executed on said moving object in which said mean pixel value shows a value not smaller than said predetermined value.

30. An intruding object detecting method according to claim 26, further comprising a step of storing judgement result in said judging step, and a step of comparing a plurality of past judgement results, wherein said extracted moving object is judged to be an intruding object or not on the basis of comparison result of said past judgement results.

* * * * *